United States Patent Office 3,494,830
Patented Feb. 10, 1970

3,494,830
PROCESS FOR PRODUCING L-THREONINE
Kiyoshi Nakayama, Sagamihara-shi, and Hiroshi Hagino, Hachioji-shi, Japan, assignors to Kyowa Hakko Kogyo Co., Ltd., Tokyo, Japan, a Japanese corporation
No Drawing. Continuation of application Ser. No. 563,085, July 6, 1966. This application Aug. 6, 1968, Ser. No. 750,455
Claims priority, application Japan, July 7, 1965, 40/40,382
Int. Cl. C12d 13/06
U.S. Cl. 195—29                                    6 Claims

ABSTRACT OF THE DISCLOSURE

The production of L-threonine by fermentation. A microorganism capable of producing L-threonine, e.g., a microorganism of Azotobacter, Arthrobacter, Bacillus, Brevibacterium, Micrococcus, Candida, Saccharomycodes or Streptomyces, is cultured in an aqueous medium containing L-aspartic acid.

CROSS-REFERENCE TO RELATED APPLICATION

This application is a continuation of copending application Ser. No. 563,085, filed on July 6, 1966 now abandoned.

This invention relates to a process for producing L-threonine. More particularly, it relates to a process for the production of L-threonine by fermentation. Even more particularly, the invention relates to a process for the production of L-threonine from L-aspartic acid by fermentation with microorganisms.

L-threonine, 2 - amino - 3 - hydroxybutanoic acid, is an essential amino acid well known in the art. It has been classified as essential in maintaining the growth of rats [Schmidt, Amino Acids, page 1265 (1944)]. L-threonine is present in whole egg, skim milk, casein, gelatin and in other proteins. It has been used medically as a nutrient, and the recommended intake thereof for the normal adult male is about 1.0 gram per day [Rose, Fed. Proc. volume 8, page 546 (1949)].

One of the objects of the present invention is to provide an improved process for the production of L-threonine which overcomes the disadvantages and deficiencies of the prior art methods.

Another object of the present invention is to provide a process for producing L-threonine by fermentation which may be carried out in an efficacious and simple manner.

A further object of the invention is to provide a process for producing L-threonine by fermentation which gives the product in high purity and good yield.

A still further object of the invention is to provide a process for producing L-threonine by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that large quantities of L-threonine are accumulated if L-aspartic acid is used as the starting material in a fermentation with various bacteria, actinomycetes or yeasts. The culture medium contains the conventional essential nutrients for the growth of the microorganisms employed in addition to an aqueous solution of L-aspartic acid. The L-threonine produced may be recovered by conventional methods.

The use of L-aspartic acid as the substrate material has been found by the present inventors to be most convenient and appropriate for producing L-threonine on a large scale.

As a result of extensive investigations with various microorganisms, the present inventors have found that microoragnisms which accumulate L-threonine in the culture liquor by conducting culturing in a medium containing L-aspartic acid as the substrate were widely distribtued as to various kinds of bacteria, actinomycetes and yeasts. Thus, there appears to be no direct relationship between a particular microorganism which is capable of producing L-threonine in this manner and its taxonomic position. Accordingly, the process of the present invention is applicable to all of the strains which have the physiological characteristics mentioned above. For example, strains belonging tot he genera Azotobacter, Arthrobacter, Brevibacterium, Bacillus, Candida, Saccharomycodes, Streptomyces and the like are suitable for use in the present invention.

As noted above, the main starting material in the present process is L-aspartic acid. The L-aspartic acid is contained in a suitable culture medium, which may be either a synthetic or a natural medium. The medium also contains essential nutrients for the growth of the strain employed. Such nutrients are well known in the art and include substances such as a carbon source, a nitrogen source, inorganic compounds and the like in appropriate amounts. Thus, as a carbon source, there may be mentioned, by way of example, carbohydrates such as glucose, fructose, maltose, sucrose, starch, starch hydrolysate, molasses, etc. or any other suitable carbon source such as glycerol, mannitol, sorbitol, organic acids, glutamic acid, etc. These substances may be used either singly or in mixtures of two or more. As a nitrogen source, various kinds of inorganic or organic salts or compounds, such as urea or ammonium salts such as ammonium chloride, ammonium sulfate, ammoniun nitrate, ammonium phosphate, etc., or one or more than one amino acid mixed in combination, or natural substances containing nitrogen, such as cornsteep liquor, yeast extract, meat extract, peptone, fish meal, casein hydrolysates, casamino acid, fish solubles, rice bran extract, etc. may be employed. Again, these substances may be used either singly or in combinations of two or more. Inorganic compounds which may be added to the culture medium includes magnesium sulfate, sodium phosphate, potassium dihydrogen phosphate, potassium monohydrogen phosphate, iron sulfate or other iron salts, manganese chloride, calcium chloride, etc. However, if culturing is carried out with the same microorganisms in a culture medium containing only the foregoing nutrients but without the addition of L-aspartic acid to the medium as the main starting material as a control test, the amount of L-threonine found to be accumulated is so small as to almost be negligible as compared with the case where L-aspartic acid is employed. The amount of L-aspartic acid used generally ranges from about 1 to 5% by weight.

Culture is carried out at a temperature of from about 25° to 40° C. with the pH being adjusted to neutral (about 7.0) at the beginning of culturing. Two to seven days of culturing are sufficient for accumulating desired amounts of L-threonine. Aerobic microorganisms are cultured under aerobic conditions, such as aerobic shaking of the culture or with stirring of a submerged culture with the introduction of air thereinto. Anaerobic microorganisms are cultured by means of a surface culture. It is preferable to maintain the culture medium at a neutral pH throughout the course of culturing.

After the completion of fermentation, the L-threonine produced is recovered from the fermentation liquor by coneventional procedures, such as ion exchange resin adsorption followed by elution, concentration and precipitation, and a countercurrent distribution method after changing to an N-benzoyl-derivative.

The following example is given merely as illustrative of the present invention and is not to be considered as limiting. Unless otherwise noted, the percentages therein are by weight.

EXAMPLE I

Various types of bacteria, actinomycetes and yeasts, as indicated in Table 1, are inoculated from an agar slant into large-sized test tubes each containing 10 ml. of the following culture medium:

| | Percent |
|---|---|
| L-aspartic acid (previously neutralized with ammonia) | 1 |
| Glucose | 1 |
| $K_2HPO_4$ | 0.05 |
| $MgSO_4 \cdot 7H_2O$ | 0.025 |
| $(NH_4)_2SO_4$ | 0.2 |
| Yeast extract | 0.3 |
| $CaCO_3$ | 0.3 |

Culturing is then carried out with aerobic shaking at 30° C. for four days. The amounts of L-threonine produced are shown in Table 1.

Table 1

| Microorganisms employed: | Amount of L-threonine produced (mg./ml.) |
|---|---|
| Azotobacter indicus KY 3201, ATCC 9037 | 0.3 |
| Arthrobacter ureafaciens KY 3152, ATCC 7562 | 0.3 |
| Arthrobacter terregens KY 3153 | 0.3 |
| Arthrobacter flavescens KY 3154 | 0.3 |
| Bacillus circulans KY 3325, ATCC 9966 | 0.3 |
| Bacillus roseus Migula KY 3354 | 0.3 |
| Brevibacterium helvolum KY 3455, ATCC 11822 | 0.3 |
| Micrococcus sodonensis KY 3466, ATCC 19212 | 0.3 |
| Candida utilis KY 5027, ATCC 16321 | 0.3 |
| Candida albicans (Syn. Parasaccharomyces ashfordi Anderson) KY 5292 | 0.3 |
| Saccharomycodes ludwigii (Syn. Saccharomyces ludwigii Hansen) KY 5371 | 0.3 |
| Streptomyces s.p. K 83 | 0.3 |
| Streptomyces s.p. K 229 | 0.3 |
| Streptomyces s.p. K 250 | 0.3 |
| Streptomyces s.p. K 514 | 0.3 |

Candida utilis ATCC 16321 was obtained from the Institute for Fermentation (Osaka, Japan) (IFO number 0396) and Micrococcus sodonensis ATCC 19212 is a natural isolate which is identified as M. sodonensis according to the description of S. Aaronson (Journal of Bacteriology, vol. 69, 0. 67–69, 1955). Bacillus roseus Migula KY 3354 was obtained from the Institute for Fermentation (IFO number 3040). Saccharomycodes ludwigii (Synonym Saccharomyces ludwigii, Hansen) was obtained from the Institute for Fermentation (IFO number 0339). Arthrobacter terregens KY 3153 and Arthrobacter flavescens KY 3154 were obtained from Dr. A. G. Locchead, Microbiological Research, Central Experiment Farm, Ottawa, Canada (KY 3153=No. 857, KY 3154=No. 860). Streptomyces K 83, Streptomyces K 229, Streptomyces K 250, Streptomyces K 514 are natural isolates. K 83 is chromogenic, reduces nitrate and forms spiral. K 229 is non-chromogenic, reduces nitrate and does not form spiral. K 250 is non-chromogenic, does not reduce nitrate and does not form spiral. K 514 is non-chromogenic, does not reduce nitrate and does not form spiral.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing L-threonine which comprises culturing a microorganism capable of producing L-threonine in an aqueous nutrient medium containing L-aspartic acid as the starting material therefor, and recovering L-threonine from the resultant culture liquor.

2. The process of claim 1, wherein the pH of the medium is maintained at about 7.0 during the said culturing and wherein said culturing is carried out under aerobic conditions.

3. The process of claim 2, wherein said culturing is carried out at a temperature of from about 25° to 40° C.

4. The process of claim 1, wherein said microorganism is of a genus selected from the group consisting of Azotobacter, Arthrobacter, Bacillus, Brevibacterium, Micrococcus, Candida, Saccharomycodes and Streptomyces.

5. A process for producing L-threonine which comprises culturing a microorganism of a genus selected from the group consisting of Azotobacter, Arthrobacter, Bacillus, Brevibacterium, Micrococcus, Candida, Saccharomycodes and Streptomyces under aerobic conditions in an aqueous nutrient medium containing L-aspartic acid as the starting material at a temperature of from about 25° to 40° C., and recovering the L-threonine produced from the resultant fermentation liquor.

6. The process of claim 5, wherein the pH of the medium is maintained at about 7.0 during the said culturing.

References Cited

UNITED STATES PATENTS

| 3,133,868 | 5/1964 | Takasue et al. | 195—30 |
| 3,375,173 | 3/1968 | Nishimura et al. | 195—29 |

LIONEL M. SHAPIRO, Primary Examiner

U.S. Cl. X.R.

195—30, 47